United States Patent
Wang et al.

(10) Patent No.: US 7,785,669 B2
(45) Date of Patent: Aug. 31, 2010

(54) METHOD FOR MAKING HIGH-DENSITY CARBON NANOTUBE ARRAY

(75) Inventors: Ding Wang, Beijing (CN); Peng-Cheng Song, Beijing (CN); Chang-Hong Liu, Beijing (CN); Shou-Shan Fan, Beijing (CN)

(73) Assignees: Tsinghua University, Beijing (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 458 days.

(21) Appl. No.: 11/967,124

(22) Filed: Dec. 29, 2007

(65) Prior Publication Data

US 2009/0028779 A1    Jan. 29, 2009

(30) Foreign Application Priority Data

Jul. 25, 2007    (CN) .................. 2007 1 0075316

(51) Int. Cl.
*B05D 3/00* (2006.01)
*B05D 3/04* (2006.01)
*B05D 5/00* (2006.01)
*C01B 31/00* (2006.01)

(52) U.S. Cl. .................. 427/369; 216/96; 427/294; 428/114; 428/34.9; 428/35.7; 428/408; 977/745

(58) Field of Classification Search .................. 427/294, 427/369; 428/114, 141, 220, 323, 336, 339, 428/401, 408
See application file for complete search history.

(56) References Cited

U.S. PATENT DOCUMENTS

| | | | |
|---|---|---|---|
| 2005/0142313 A1* | 6/2005 | Grah | 428/35.7 |
| 2008/0087646 A1* | 4/2008 | Liu et al. | 216/96 |
| 2009/0029052 A1* | 1/2009 | Luo et al. | 427/294 |

OTHER PUBLICATIONS

Zhang, Mei et al. "Strong, Transparent, Multifunctional, Carbon Nanotube Sheets". Science 309, pp. 1215-1219 (2005).*

* cited by examiner

*Primary Examiner*—Michael Kornakov
*Assistant Examiner*—Alexander Weddle
(74) *Attorney, Agent, or Firm*—Jeffrey T. Knapp

(57) ABSTRACT

A method for making a high-density carbon nanotube array includes the steps of: (a) providing a substrate having a carbon nanotube array formed thereon; (b) providing an elastic film; (c) stretching the elastic film uniformly, and covering the elastic film to the carbon nanotube array; (d) exerting a pressure uniformly on the elastic film, and shrinking the carbon nanotube array and the elastic film under the pressure; and (e) separating the nanotube array from the elastic film to acquire a high-density carbon nanotube array.

11 Claims, 2 Drawing Sheets

METHOD FOR MAKING HIGH-DENSITY CARBON NANOTUBE ARRAY

BACKGROUND

1. Field of the Invention

The present invention relates to methods for making carbon nanotube arrays, particularly, to a method for making a high-density carbon nanotube array.

2. Discussion of Related Art

Carbon nanotubes (CNT) are a novel carbonaceous material and received a great deal of interest since the early 1990s. Carbon nanotubes have interesting and potentially useful electrical and mechanical properties. The conventional method for making carbon nanotube array includes arc discharge method, laser ablation method, and chemical vapor deposition (CVD) method.

Nowadays, the method for growing a CNT array on a substrate, such as a glass, silicon, or heat-resistant metal substrate, using the CVD method has matured. However, the density of the carbon nanotube array grown directly is restricted by the grown method of CVD, and the density cannot be regulated according to actual applications/uses. More so, the distance between the carbon nanotubes of the carbon nanotube array grown directly is several times of the diameter of the carbon nanotubes, and the maximal density of the carbon nanotube array is about 0.01 g/cm$^3$ (gram/centimeter$^3$). Thus the density of the carbon nanotube array grown directly is low and as a result, the properties of the carbon nanotube array such as heat conductive property, electricity conductive property cannot satisfy the actual applications/uses.

What is needed, therefore, is a simple method for making a high-density carbon nanotube array, and the carbon nanotubes in the carbon nanotube array are uniform and arranged in a preferred orientation.

SUMMARY

In one embodiment, a method for making a high-density carbon nanotube array includes the steps of: (a) providing a substrate having a carbon nanotube array formed thereon; (b) providing an elastic film; (c) stretching the elastic film uniformly, and covering the elastic film on the carbon nanotube array; (d) applying a pressure uniformly on the elastic film to make the carbon nanotube array adhere to the elastic film, and shrinking the elastic film and the carbon nanotube array under the pressure; and (e) separating the nanotube array from the elastic film to acquire a high-density carbon nanotube array.

Other advantages and novel features of the present method for making the high-density carbon nanotube array will become more apparent from the following detailed description of preferred embodiments when taken in conjunction with the accompanying drawings.

BRIEF DESCRIPTION OF THE DRAWINGS

Many aspects of the present method for making the high-density carbon nanotube array can be better understood with reference to the following drawings. The components in the drawings are not necessarily to scale, the emphasis instead being placed upon clearly illustrating the principles of the present method for making the high-density carbon nanotube array.

Figure 1:
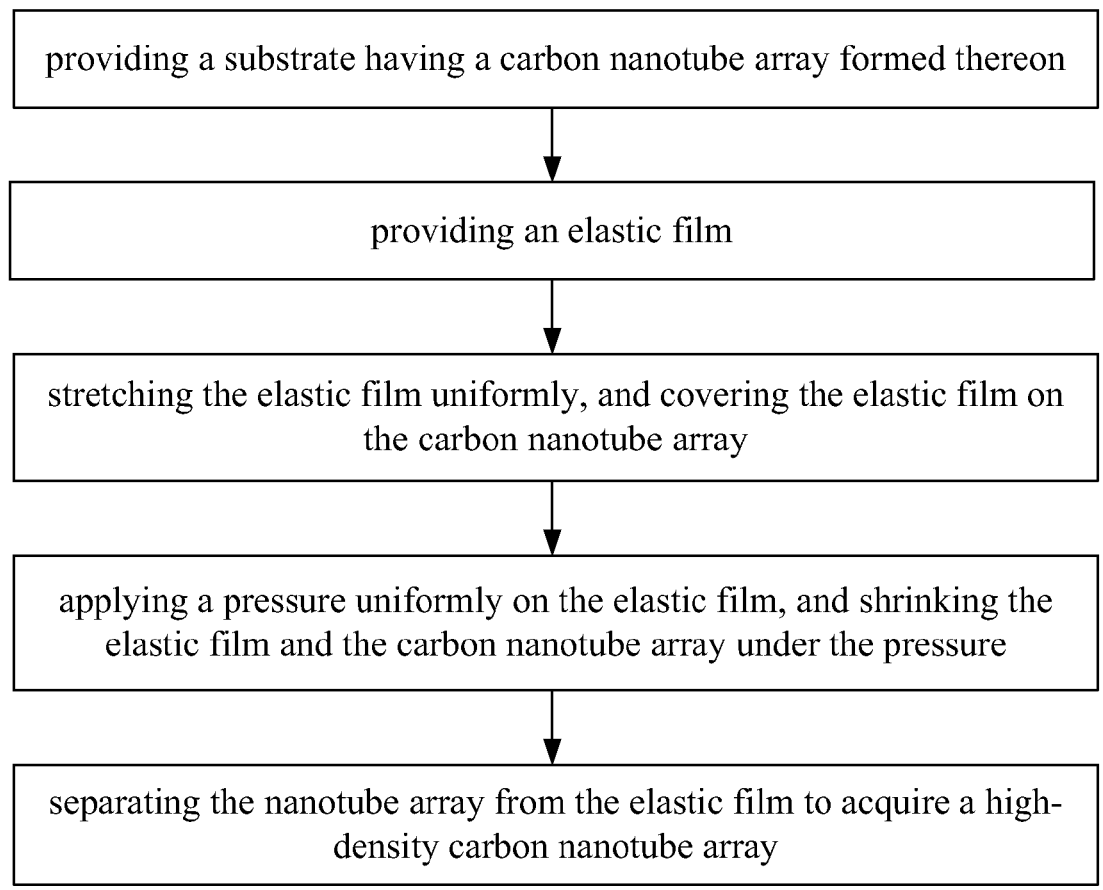
FIG. 1 is a flow chart of a method for making a high-density carbon nanotube array, in accordance with a present embodiment.
Figure 2:
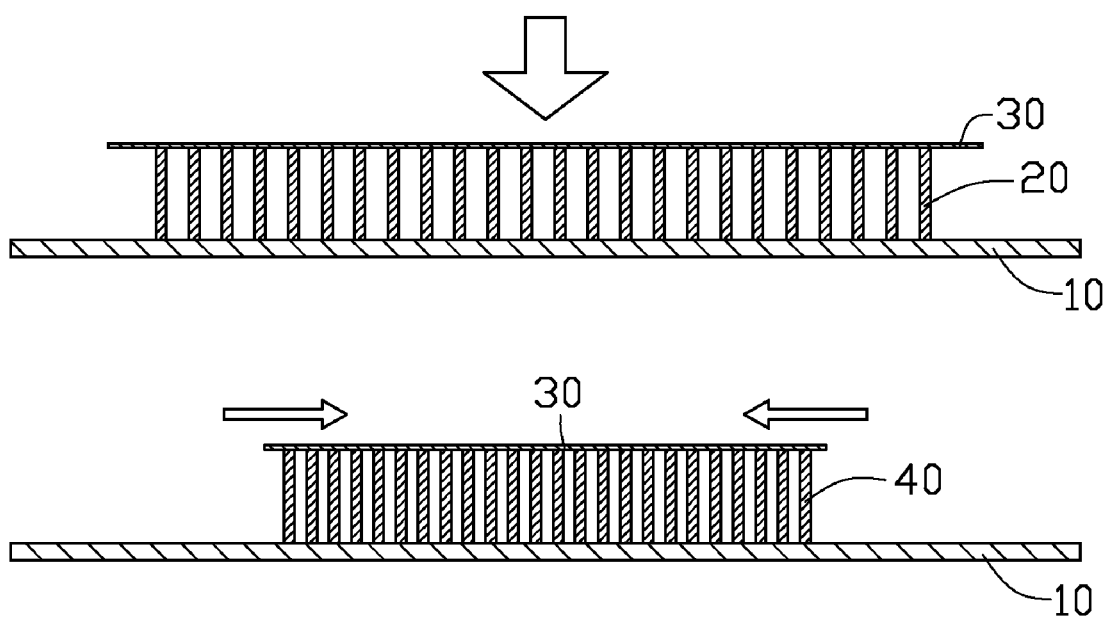
FIG. 2 is a schematic view of the carbon nanotube array shrunk with the elastic film, in accordance with a present embodiment.

Corresponding reference characters indicate corresponding parts throughout the several views. The exemplifications set out herein illustrate at least one preferred embodiment of the present method for making the high-density carbon nanotube array, in at least one form, and such exemplifications are not to be construed as limiting the scope of the invention in any manner.

DETAILED DESCRIPTION OF PREFERRED EMBODIMENTS

Reference will now be made to the drawings to describe, in detail, embodiments of the present method for making the high-density carbon nanotube array.

Referring to FIG. 1, a method for making a high-density carbon nanotube array 20 includes the steps of: (a) providing a substrate 10 having a carbon nanotube array 20 formed thereon; (b) providing an elastic film 30; (c) stretching the elastic film 30 uniformly, and covering the elastic film 30 on the carbon nanotube array 20; (d) applying a pressure uniformly on the elastic film 30 to make the carbon nanotube array 20 adhere to the elastic film 30, and shrinking the elastic film 30 and the carbon nanotube array 20 under pressure; and (e) separating the carbon nanotube array 20 from the elastic film 30 to acquire a high-density carbon nanotube array 40.

In step (a), the carbon nanotube array 20 is a super-aligned array of carbon nanotubes, the super-aligned array of carbon nanotubes can be formed by the steps of: (a1) providing a substantially flat and smooth substrate 10; (a2) forming a catalyst layer on the substrate 10; (a3) annealing the substrate 10 with the catalyst layer thereon in air at a temperature in an approximate range from 700° C. to 900° C. for about 30 to 90 minutes; (a4) heating the substrate 10 with the catalyst layer thereon at a temperature in an approximate range from 500° C. to 740° C. in a furnace with a protective gas therein; and (a5) supplying a carbon source gas to the furnace for about 5 to 30 minutes and growing a super-aligned array of carbon nanotubes on the substrate.

In step (a1), the substrate 10 can be a P-type silicon wafer, an N-type silicon wafer, or a silicon wafer with a film of silicon dioxide thereon. Preferably, a 4 inch P-type silicon wafer is used as the substrate 10. In step (a2), the catalyst can, advantageously, be made of iron (Fe), cobalt (Co), nickel (Ni), or any alloy thereof.

In step (a4), the protective gas can, beneficially, be made up of at least one of nitrogen ($N_2$), ammonia ($NH_3$), and a noble gas. In step (a5), the carbon source gas can be a hydrocarbon gas, such as ethylene ($C_2H_4$), methane ($CH_4$), acetylene ($C_2H_2$), ethane ($C_2H_6$), or any combination thereof.

The super-aligned array of carbon nanotubes can, opportunely, have a height of about 200 to 400 microns and includes a plurality of carbon nanotubes parallel to each other and approximately perpendicular to the substrate. The super-aligned array of carbon nanotubes formed under the above conditions is essentially free of impurities, such as carbonaceous or residual catalyst particles. The carbon nanotubes in the super-aligned array are closely packed together by the van der Waals attractive force.

In step (b), the material of the elastic film 30 can be any elastic polymer, such as silicon rubber, butadiene rubber, natural rubber, isoprene rubber, styrene-butadiene rubber, and so on. In the present embodiment, the material of the elastic film 30 is silicon rubber.

In step (c), the elastic film 30 can be stretched along one direction or two directions. The elastic film 30 stretched along one direction means stretching the elastic film 30 along a direction of a length or a width of the elastic film 30. The elastic film 30 stretched along two directions means stretching the elastic film 30 along directions of a length and a width of the elastic film 30 at the same time. In the present embodiment, the elastic film 30 is stretched along directions of a length and a width of the elastic film 30 at the same time. After stretching, the stretched elastic film 30 is covered on one end of the carbon nanotube array 20 away from the substrate.

In step (d), a pressure is applied uniformly on the elastic film 30 to make the elastic film contact with and adhere to the carbon nanotube array firmly. The direction of the applied pressure is perpendicular to the substrate. Since the adhesive force between the carbon nanotube array 20 and the elastic film 30 is larger than the adhesive force between the carbon nanotube array 20 and the substrate 10, when the elastic film 30 is shrinking, the carbon nanotube array 20 shrinks with the elastic film 30 and separates from the substrate 10. The carbon nanotube array 20 and the elastic film 30 can be shrunk along one direction or two directions. The carbon nanotube array 20 and the elastic film 30 shrunk along one direction means shrinking the carbon nanotube array 20 and the elastic film 30 along a length or a width of the elastic film 30. The carbon nanotube array 20 and the elastic film 30 shrunk along two directions means shrinking the carbon nanotube array 20 and the elastic film 30 along a length and a width of the elastic film 30 at the same time. In the present embodiment, the carbon nanotube array 20 and the elastic film 30 is shrunk along a length and a width of the elastic film 30 at the same time.

In step (e), the carbon nanotube array 20 is separated from the elastic film 30 by a mechanical means. In the present embodiment, the elastic film 30 is mechanically pulled from the carbon nanotube array 20. Since the density of the carbon nanotubes in the carbon nanotube array 20 is high, the adhesive forces between the carbon nanotubes in the carbon nanotube array 20 is large enough to make the carbon nanotube array form a free-standing structure and thus a high-density carbon nanotube array 40 is acquired. It can be understood that the method for separating the carbon nanotube array 20 and the elastic film 30 is not restricted to the mechanical method, and any other methods that can separate the carbon nanotube array 20 and elastic film 30 also can be used.

The density of the high-density carbon nanotube array 40, according to the present embodiment, can be 5 to 50 times that of the carbon nanotube array 20 grown directly by CVD method. In the present embodiment, the carbon nanotubes in the high-density carbon nanotube array 40 are uniform, compact, and arranged in a preferred orientation, and the density of the high-density carbon nanotube array 40 is 15 times that of the carbon nanotube array 20 grown directly by CVD method. The density of the high-density carbon nanotube array 40 can be controlled by controlling the extent of shrinking the elastic film 30.

The method for making the high-density carbon nanotube array, according to the present embodiment, is simple and easy to be applied. What is more, the density of the high-density carbon nanotube array is high and can be 5 to 50 times that of the carbon nanotube array grown directly by CVD method. Finally, the carbon nanotubes in the high-density carbon nanotube array are uniform, compact, and arranged in a preferred orientation. The high-density carbon nanotube array made by the present method has excellent properties and can be applied to a variety of fields, such as heat conductive material, electricity conductive material, electromagnetism shielding material, composite material, and so on.

Finally, it is to be understood that the above-described embodiments are intended to illustrate rather than limit the invention. Variations may be made to the embodiments without departing from the spirit of the invention as claimed. The above-described embodiments illustrate the scope of the invention but do not restrict the scope of the invention.

What is claimed is:

1. A method for making a high-density carbon nanotube array, the method comprising the steps of:
   (a) providing a substrate having a carbon nanotube array formed thereon;
   (b) providing an elastic film;
   (c) stretching the elastic film uniformly, and covering the elastic film on the carbon nanotube array;
   (d) applying a pressure uniformly on the elastic film, and shrinking the elastic film and the carbon nanotube array under the pressure; and
   (e) separating the carbon nanotube array from the elastic film to acquire a high-density carbon nanotube array.

2. The method as claimed in claim 1, wherein in step (b), the material of the elastic film is silicon rubber, butadiene rubber, natural rubber, isoprene rubber, and styrene-butadiene rubber.

3. The method as claimed in claim 1, wherein in step (c), the elastic film is stretched along one direction or two directions.

4. The method as claimed in claim 3, wherein the elastic film stretched along one direction means stretching the elastic film along a direction of a length or a width of the elastic film.

5. The method as claimed in claim 3, wherein the elastic film stretched along two directions means stretching the elastic film along directions of a length and a width of the elastic film at the same time.

6. The method as claimed in claim 1, wherein in step (c), the stretched elastic film is covered on one end of the carbon nanotube array away from the substrate.

7. The method as claimed in claim 1, wherein in step (d), a direction of the applied pressure is perpendicular to the substrate.

8. The method as claimed in claim 1, wherein in step (d), the carbon nanotube array and the elastic film are shrunk along one direction or two directions.

9. The method as claimed in claim 8, wherein the carbon nanotube array and the elastic film shrunk along one direction means shrinking the carbon nanotube array and the elastic film along a direction of a length or a width of the elastic film.

10. The method as claimed in claim 8, wherein the carbon nanotube array and the elastic film shrunk along two directions means shrinking the carbon nanotube array and the elastic film along directions of a length and a width of the elastic film at the same time.

11. The method as claimed in claim 1, wherein in step (e), the carbon nanotube array is separated from the elastic film by a mechanical means.

* * * * *